United States Patent [19]
Maki et al.

[11] 3,932,321
[45] Jan. 13, 1976

[54] FLAME-RETARDANT POLYMER COMPOSITION

[75] Inventors: Hirohisa Maki, Osaka; Yozo Kitagawa, Yokkaichi, both of Japan

[73] Assignees: Japan Synthetic Rubber Company Limited; Dai-Ichi Kogyo Seyaku Co. Ltd., both of Japan

[22] Filed: June 6, 1974

[21] Appl. No.: 477,024

[30] Foreign Application Priority Data
June 18, 1973 Japan................................ 48-68461
June 18, 1973 Japan................................ 48-68462

[52] U.S. Cl. ...... 260/17.4 R; 260/17.4 BB; 260/2 P; 260/42.18; 260/47 UA; 260/836; 260/837 R; 260/862; 260/873; 260/874; 260/876 R; 260/887; 260/888; 260/889; 260/890; 260/893; 260/894; 260/897 C; 260/899; 260/901
[51] Int. Cl.².....................C08L 23/00; C08L 33/04; C08L 67/06
[58] Field of Search.... 260/476 A, 17.4 BB, 17.4 R, 260/836, 837 R, 862, 873, 876 R, 887, 888, 889, 890, 893, 894, 897, 899, 901

[56] References Cited
UNITED STATES PATENTS

| | | | |
|---|---|---|---|
| 3,162,613 | 12/1964 | Tousignant | 260/45.7 P |
| 3,277,053 | 10/1966 | Hill | 260/47 UA |
| 3,817,913 | 6/1974 | Gaenzler | 260/47 UA |

FOREIGN PATENTS OR APPLICATIONS

| | | |
|---|---|---|
| 826,831 | 1/1960 | United Kingdom |
| 1,051,503 | 2/1959 | Germany |
| 550,189 | 10/1957 | Belgium |

*Primary Examiner*—Paul Lieberman
*Attorney, Agent, or Firm*—Toren, McGeady and Stanger

[57] ABSTRACT

A flame-retardant polymer composition comprising a flame-retardant polymer and a different kind of a polymer, the amount incorporated of the flame-retardant polymer being 2 to 50 percent by weight based on the different polymer and said flame-retardant polymer being prepared by copolymerizing 2 to 100 percent by weight of a monomer represented by the following general formula (A)

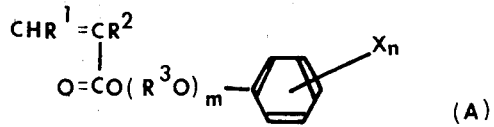

wherein $R^1$ and $R^2$ stand for H or $CH_3$, $R^3$ is a linear or branched alkylene group having 2 to 6 carbon atoms, which may be substituted by a hydroxyl group, X designates Br or Cl, n is a number of from 3 to 5, and m is a number of from 0 to 1, with 98 to 0 percent by weight of at least one unsaturated compound copolymerizable with the monomer (A).

7 Claims, No Drawings

FLAME-RETARDANT POLYMER COMPOSITION

This invention relates to a flame-retardant polymer composition obtained by incorporating in a polymer a novel high-molecular-weight flame retardant.

Various substances have heretofore been proposed as flame retardants for macromolecular substances such as fibers and plastics. For example, a variety of organic halogen compounds, halogen-containing acid esters, antimony oxides and phosphates have heretofore been used. These substances are generally effective, but since their molecular weights are low (for example, not higher than 1000), when they are incorporated into macromolecular substances such as fibers or plastics, with the lapse of time they migrate into the surface portion and they are scattered and lost under external influences, with the result that the flame retardancy is reduced or lost. In the case of reactive-type flame retardants such defect is not brought about, but various limitations are imposed on macromolecular substances to which the flame retardants are added. In case polymerization is conducted by adding such reactive-type flame retardant to starting monomers of the objective polymer, there are often brought about such undesired phenomena as polymerization inhibition by the flame retardant and prolongation of the reaction time. For example, it is known that tetrabromobisphenol A is used as a flame retardant in preparing a flame-retardant polycarbonate composition (see, for example, U.S. Pat. No. 3,334,154), but when tetrabrombisphenol A is mixed with the starting monomer and a copolymer is prepared from the mixture, as the bromine atom substituted on the aromatic ring has a large size, steric hindrance is brought about and a long time is required for completion of the copolymerization. Further, according to this known method, since the temperature for molding of the polycarbonate resin is high (for example, 280° to 320°C.), discoloration and reduction of the strength are caused to occur in the flame-retardant polycarbonate composition. For this reason, in order to render a polycarbonate resin flame retardant, it is preferred to use a flame retardant that can also act as a plasticizer. However, if a low-molecular-weight flame retardant is added and used, such properties of the macromolecular substance as tensile forth, bending strength and weatherability are degraded and the transparency is also reduced, and therefore, the commercial value is drastically lowered in many cases. Moreover, some of low-molecular-weight flame retardants such as PCB and γ-BHC are poisonous and give irritations to the skin.

It is therefore a primary object of this invention to provide a flame-retardant polymer composition in which the above-mentioned defects involved in conventional low-molecular-weight additive-type flame retardants and reactive-type flame retardants can be overcome.

More specifically, the primary object of this invention is to provide a flame-retardant polymer composition comprising a flame-retardant polymer and a different kind of a polymer, the amount incorporated of the flame-retardant polymer being 2 to 50 percent by weight based on the different polymer and said flame-retardant polymer being prepared by copolymerizing 2 to 100 percent by weight of a monomer represented by the following general formula (A)

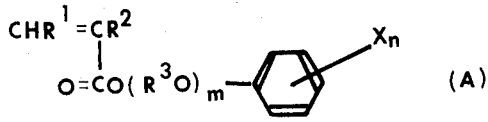

wherein $R^1$ and $R^2$ stand for H or $CH_3$, $R^3$ is a linear or branched alkylene group having 2 to 6 carbon atoms, which may be substituted by a hydroxyl group, X designates Br or $Cl$, n is a number of from 3 to 5, and m is a number of from 0 to 1, with 98 to 0 percent by weight of at least one unsaturated compound copolymerizable with the monomer (A).

Many monomers can be mentioned as the monomer represented by the above general formula (A), and among these monomers, compounds represented by the following general formulae [I] to [IV] are preferred:

(I) 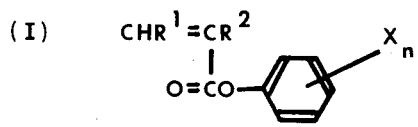

(II) 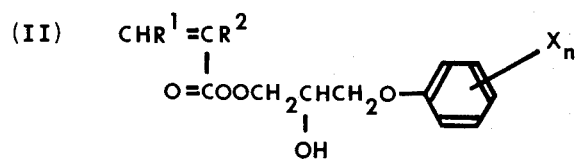

(III) 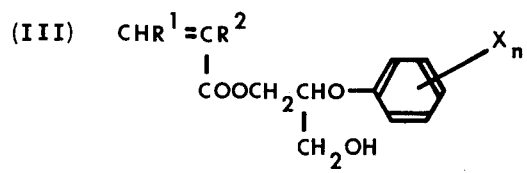

(IV) 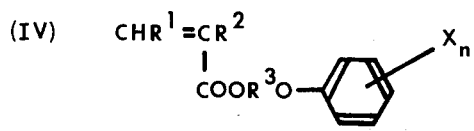

wherein $R^1$ and $R^2$ stand for H or $CH_3$, $R^3$ is a linear or branched alkylene group having 2 to 6 carbon atoms, X is Br or $Cl$, and n is a number of from 3 to 5.

As preferred examples of the monomer represented by the above general formula [I], there can be mentioned 2,4,6-tribromophenyl acrylate, 2,4,6-tribromophenyl methacrylate, 2,4,6-trichlorophenyl acrylate, 2,4,6-trichlorophenyl methacrylate, pentabromophenyl acrylate, pentachlorophenyl acrylate, pentachlorophenyl methacrylate and the like.

As the monomer represented by the general formula [II], there can be mentioned, for example, 2-hydroxy-3-tribromophenoxypropyl methacrylate, 2-hydroxy-3-trichlorophenoxypropyl methacrylate, 2-hydroxy-3-trichlorophenoxypropyl acrylate and the like.

As typical instances of the monomer represented by the general formula [III], there can be mentioned 3-hydroxy-2-tribromophenoxypropyl methacrylate, 3-hydroxy-2-trichlorophenoxypropyl methacrylate, 3-hydroxy-2-trichlorophenoxypropyl acrylate and the like.

As typical instances of the monomer represented by the general formula [IV], there can be mentioned, 2-trichlorophenoxyethyl acrylate, 2-trichlorophenoxyethyl methacrylate, 2-tribromophenoxyethyl acrylate, 2-tribromophenoxyethyl methacrylate, 2-pentachlorophenoxyethyl acrylate, 2-pentachlorophenoxyethyl methacrylate, 2-pentachlorophenoxy-2-methylethyl acrylate, 2-pentabromophenoxy-2-methylethyl acrylate, 2-pentachlorophenoxy-2-butyl acrylate, 2-pentabromophenoxy-2-butyl methacrylate, 4-tribromophenoxybutyl acrylate, 4-tribromophenoxybutyl methacrylate, 4-pentachlorophenoxybutyl acrylate, 4-pentachlorophenoxybutyl acrylate, 4-pentachlorophenoxybutyl methacrylate, 4-pentabromophenoxybutyl methacrylate and the like.

These monomers can be used singly or in the form of a mixture of two or more of them.

As the unsaturated compound copolymerizable with the above flame retardant monomer, that is used in this invention, there can be mentioned, for example, halogenated olefins such as vinyl chloride, vinylidene chloride and vinyl bromide, vinyl aromatic compounds such as chlorostyrene, conjugated dienes such as chloroprene, vinyl esters of carboxylic acids such as 1,4,5,6,7,7-hexachlorobicyclo-[2,2,1]-5-heptane-2-carboxylic acid vinyl ester and 1,4,5,6,7,7-hexabromobicyclo-[2,2,1]-5-heptene-2-carboxylic acid vinyl ester, nitrogen-containing unsaturated compounds such as triallyl cyanurate, and phosphorus-containing unsaturated compounds represented by the following general formulae:

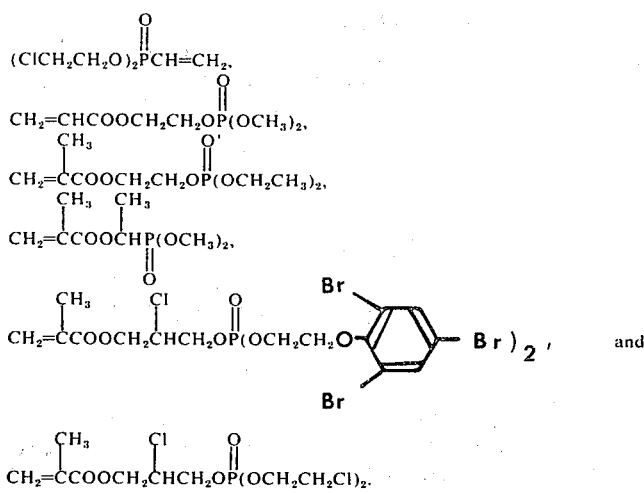

The unsaturated compound copolymerizable with the monomer (A), that can be used in this invention, is not limited to those exemplified above, but in general, it is preferred to employ halogen-containing and/or phosphorus containing unsaturated compounds, in order to obtain high flame retardancy. It is possible to copolymerize two or more of these unsaturated compounds with the monomer represented by the general formula (A).

In forming the flame-retardant polymer, the monomer (A) is used in an amount of at least 2 percent by weight, preferably at least 50 percent by weight. When the amount used of the monomer (A) is smaller than 2 percent by weight, the intended high flame retardancy cannot be obtained.

Homopolymerization of the flame-retardant monomer (A) or copolymerization of the flame-retardant monomer (A) with an unsaturated compound copolymerizable therewith can be performed according to any of known emulsion polymerization, suspension polymerization, bulk polymerization and solution polymerization methods. In case other flame retardant is used in combination, the monomer (A) or its mixture with a copolymerizable unsaturated compound and other flame retardant (for example, polyvinyl chloride) are dissolved in a solvent and then, polymerization is conducted, whereby a flame-retardant polymeric material composed of a homogeneous mixture of the flame-retardant polymer of this invention and polyvinyl chloride is obtained.

It is desired that the so obtained flame-retardant polymer of this invention has a molecular weight not lower than 1,000.

A polymer obtained by homopolymerization of a monomer represented by the general formula (A) is an aromatic nucleus substituted halogen compound having not only excellent flame retardancy but higher heat stability than aliphatic halogen compounds. If this polymer is molded at such a high temperature as, for example, temperatures adopted for heat molding of polycarbonate resins, none of poisonous gases such as HCl and HBr are generated during processing of the resin, the commercial value of the molded product is not reduced and it hardly gives irritations to the human body or has hardly corrosive actions to processing machines.

In case a halogen-containing aliphatic vinyl compound is chosen as a comonomer to be copolymerized with a monomer represented by the general formula (A), the resulting polymer comes to have both the aromatic nucleus-substituted halogen and the aliphatic chain-substituted halogen and the decomposition temperature range of the polymer is broadened. Accordingly, better results are obtained when such polymer is employed. Further, when the monomer (A) is copolymerized with a phosphorus-containing unsaturated compound, the resulting polymer comprises both halogen and phosphorus, and in this polymer a synergistic effect is brought about by halogen and phosphorus and the flame retardant effect is further improved [J. Fire & Flammability, 1, 302 (1970)].

These flame-retardant polymers have a good compatibility with other polymers, and when they are incorporated and kneaded into other polymers, they are not scattered and lost from the surface under external influences and therefore, the flame retardancy of the resulting polymer compositions is not reduced or lost.

Different polymers into which the flame-retardant polymer of this invention is incorporated and kneaded include thermoplastic resins such as polypropylene, polystyrene, ABS resins, acrylic resins, polyester resins and polycarbonate resins, thermosetting resins such as phenol resins, unsaturated polyester resins, epoxy resins and cellulose resins, and rubbery polymers such as styrene-butadiene rubbers, acrylonitrile-butadiene rubbers, polybutadiene rubbers, polyisoprene rubbers, ethylenepropylene rubbers, butyl rubbers, polychloroprene rubbers, acrylic rubbers and epichlorohydrin rubbers. These polymers can be used singly or in the form of a mixture of two or more of them.

The amount of the flame-retardant polymer incorporated in a different kind of a polymer is 2 to 50 percent by weight, preferably 5 to 35 percent by weight, based on the different polymer. In case said amount is not less than 50 percent by weight, the physical property of said polymer becomes worse frequently. Mixing of both the polymers can be accomplished by an optional method. For instance, both the polymers are molten and blended in the molten state.

The flame-retardant polymer composition of this invention may further comprise additives ordinarily used for resins and rubbers, such as stabilizers, lubricants and the like. The flame-retardant polymer composition of this invention can be reinforced by glass fibers or other fibers, or it can be formed into foams by incorporation of a blowing or foaming agent. Still further, a flame retardant assistant such as $Sb_2O_3$ can optionally be incorporated in the flame-retardant polymer composition of this invention.

This invention will now be illustrated more detailedly by reference to the following Examples, which by no means limit the scope of this invention. In the following Examples, all of "parts" and "percent" are on the weight basis.

EXAMPLE 1

500 parts of pentachlorophenyl acrylate and 0.5 part of di-tert-butyl peroxide were dissolved in 1500 parts of toluene, and when the mixture was agitated for 30 minutes under reflux of toluene, the viscosity of the reaction solution increased. Then, the reaction solution was cooled to room temperature, and 3,000 parts of methanol was added thereto and the mixture was agitated to precipitate white powder. The powder was recovered by filtration and dried to obtain 490 parts of a polymer having an average molecular weight of 1,500 and a chlorine content of 55.1 percent. The theoretical chlorine content of this polymer is 55.30 percent.

EXAMPLE 2

7 parts of a pentachlorophenyl acrylate polymer (having an average molecular weight of 1500) represented by the following general formula

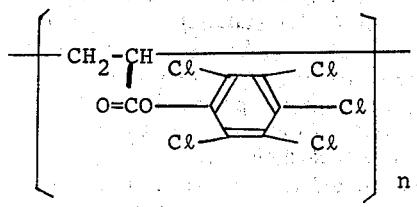

which was obtained in Example 1, was mixed and kneaded at 270°C. with 100 parts of bisphenol A polycarbonate (having an average molecular weight of 25,000), and the kneaded mixture was injection molded. The molded sample was not broken when taken out of the mold (namely, the polymer composition had a very good moldability), and no discoloration was observed and the sample was excellent in transparency. The viscosity average molecular weight was found to be 22,500.

When the so formed test piece was subjected to the combustion test according to the method UL-94, it was found that the grade of the flame retardancy of the test piece was SE-1.

40 g of the same composition as the preliminarily formed resin composition (the above mixture of the pentachlorophenyl acrylate polymer and the polycarbonate resin) was charged in a three-neck flask, and it was heated while blowing $N_2$ thereinto. The effluent gas was introduced into an aqueous solution of KOH and the change of the KOH concentration was traced. From the change of the KOH concentration brought about by conducting heating at 360°C for 1 hour, it was found that the amount of HC$l$ gas generated from this flame-retardant composition was 15 ppm. Thus, it was confirmed that the amount of the acidic gas generated by heating was very small, though the heating was conducted at a very high temperature.

COMPARATIVE EXAMPLE

A mixture of 90 percent of bisphenol A and 10 percent of tetrabromobisphenol A was reacted with phosgene in a methylene chloride reaction medium containing p-tert-butylphenol, pyridine and calcium hydroxide, and the resulting copolymer was dried at 125°C and molded at about 360°C. The molded product was broken when it was taken out of the mold, and it was found that the molded product was very brittle. Further, since the copolymer had a very high viscosity at the time of melting, it could not fill the space of the mold sufficiently.

EXAMPLE 3

A flame-retardant polymer obtained by copolymerizing 2-tribromophenoxyethyl acrylate with a phosphorus-containing unsaturated compound represented by the following formula

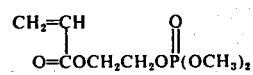

(1 : 1 copolymer having an average molecular weight of 1,900 and an acrylate monomer content of 65.7 percent by weight) was molten and kneaded with a combustible resin indicated in Table 1 by means of Brabender Plastograph, and the kneaded mixture was compression molded. The molded sample was subjected to the combustion test according to the method of ASTM-D635-56T. Results are shown in Table 1. When these resins were subjected to the combustion test without incorporation of the above flame-retardant polymer, each resin was completely burnt. The flame-retardant polymer had a good comparability with each of these resins, and in each case there was obtained a transparent flame-retardant polymer composition.

unsaturated polyester resin composition was colorless and transparent.

Table 1

| Resin | Amount of Resin | Amount of Flame-Retardant Polymer | Combustibility |
|---|---|---|---|
| crystalline polypropylene | 80 parts | 18 parts 5 parts of $Sb_2O_3$ | self-extinguishing, below 4 seconds |
| polyacetal | 70 parts | 30 parts | self-extinguishing, below 5 seconds |
| polystyrene | 85 parts | 20 parts | self-extinguishing, below 5 seconds |
| polymethyl-methacrylate | 80 parts | 23 parts | self-extinguishing, below 5 seconds |
| low pressure method polyethylene | 90 parts | 15 parts | self-extinguishing, below 5 seconds |

EXAMPLE 4

15 parts of a flame-retardant polymer formed by copolymerizing 2-tribromophenolethyl acrylate with pentabromophenyl methacrylate (1:1 copolymer having an average molecular weight of 2300 and an acrylate monomer content of 43.5 percent by weight) was molten and kneaded with 100 parts of an ABS resin by means of Brabender Plastograph, and the mixture was compression molded. The molded sample was subjected to the combustion test according to the method of ASTM-D635 -56T, and it was found that the sample was self-extinguishing. The sample had a tensile force of 370 Kg/cm² as measured according to ASTM-D638 and a heat distortion temperature of 85°C. as measured under a load of 18.6 Kg/cm² according to ASTM-D648. The sample prepared from the ABS resin alone without incorporation of the flame-retardant polymer had a tensile force of 386 Kg/cm² and a heat distortion temperature of 90°C. Thus, it was confirmed that these physical properties of the ABS resin were not drastically degraded by incorporation of the flame-retardant polymer.

EXAMPLE 5

8 parts of a flame-retardant polymer formed by copolymerizing 4-pentabromophenoxybutyl methacrylate with a phosphorus-containing unsaturated compound represented by the following formula

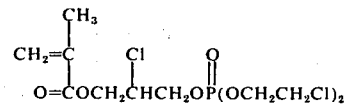

(1 : 1 copolymer having an average molecular weight of 1,800 and a methacrylate monomer content of 61.6 percent by weight) was uniformly mixed into a mixture of 80 parts of an unsaturated polyester resin and 20 parts of styrene, and 3 parts of methylethylketone peroxide was added as a catalyst to the mixture and dissolved uniformly therein. Then, 3 parts of cobalt naphthenate was added as a promotor to the mixture, and the mixture was agitated sufficiently. The resulting resin solution was cast into a Teflon-coated resin-molded mold (having a length of 14.5 cm and a width of 11.8 cm) and allowed to stand still at room temperature overnight, to thereby solidify the resin. Then, the cast product was post-cured for 1 hour in a drier maintained at 100°C. When the so formed molded product was subjected to the combustion test according to the method of ASTM-D635-56T, it was found that the molded product was incombustible. This incombustible unsaturated polyester resin composition was colorless and transparent.

EXAMPLE 6

70 parts of 2-hydroxy-3-tribromophenoxypropyl methacrylate and 15 parts of bischloroethylvinyl phosphonate represented by the following formula

were dissolved in 250 parts of benzene, and 0.5 part of azobisisobutyronitrile was added as an initiator to the solution. The solution was kept under reflux of benzene for 3 hours, and it was poured into a large quantity of methanol and the mixture was agitated to form a viscous liquid. The liquid was washed sufficiently with methanol and dried to obtain a copolymer having a 2-hydroxy-3-tribromophenoxypropyl methacrylate content of 80.2 percent by weight. 25 parts of the so obtained polymer was molten and kneaded with 75 parts of polystyrene by means of Brabender Plastograph and the mixture was compression molded. When the molded product was subjected to the combustion test according to the method of ASTM-D635-56I, it was found that the molded product was self-extinguishing.

What is claimed is:

1. A flame-retardant polymer composition comprising a flame-retardant polymer and a different kind of a polymer, the amount incorporated of the flame-retardant polymer being 2 to 50 percent by weight based on the different polymer and said flame-retardant polymer being prepared by copolymerizing 2 to 100 percent by weight of a monomer represented by the following general formula (A)

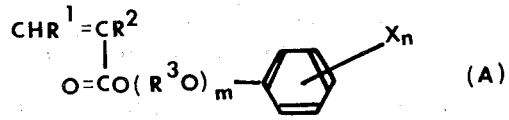

wherein $R^1$ and $R^2$ stand for H or $CH_3$, $R^3$ is a linear or branched alkylene group having 2 to 6 carbon atoms, which may be substituted by a hydroxyl group, X designates BR or Cl, n is a number of from 3 to 5, and m is a number of from 0 to 1, with 98 to 0 percent by weight of at least one unsaturated compound copolymerizable with the monomer (A) selected from the group consisting of:
  halogenated olefins,
  halogenated vinyl aromatic compounds,
  halogenated vinyl esters of carboxylic acids, halogenated conjugated dienes, nitrogen containing unsaturated compounds, and phosphorous-containing unsaturated compounds, and wherein the different polymer into which the flame-retardant polymer is incorporated is at least one member selected from the group consisting of polypropylene, polystyrene, ABS resins, acrylic resins, polyester resins, polycarbonate resins, phenol resins, unsaturated polyester resins, epoxy resins, cellulose resins, styrene-butadiene rubbers, acrylonitrile-butadiene rubbers, polybutadiene rubbers, polyisoprene rubbers, ethylene-propylene rubbers, butyl rubbers, polychloroprene rubbers, acrylic rubbers and epichlorohydrin rubbers.

2. A flame-retardant polymer composition set forth in claim 1 wherein the monomer represented by the general formula (A) is at least one member selected from the group consisting of compounds represented by the following general formula [I] to [IV]:

(I) 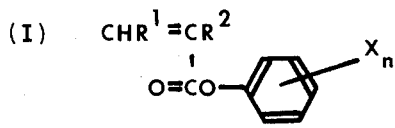

(II) 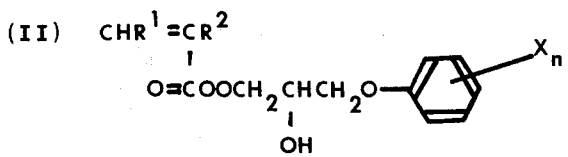

(III) 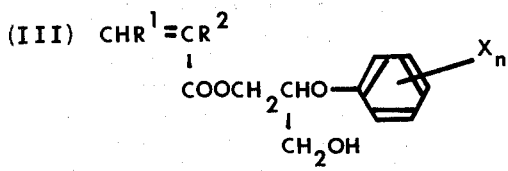

(IV) 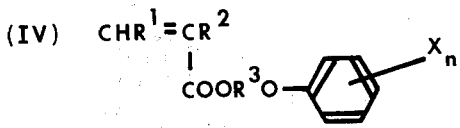

wherein $R^1$ and $R^2$ stand for H or $CH_3$, $R^3$ is a linear or branched alkylene group having 2 to 6 carbon atoms, X is Br or Cl, and n is a number of from 3 to 5.

3. A flame-retardant polymer composition set forth in claim 1 wherein the monomer represented by the general formula (A) is at least one member selected from the group consisting of 2,4,6-tribromophenyl acrylate, 2,4,6-tribromophenyl methacrylate, 2,4,6-trichlorophenyl acrylate, 2,4,6-trichlorophenyl methacrylate, pentabromophenyl acrylate, pentachlorophenyl acrylate, pentachlorophenyl methacrylate, 2-hydroxy-3-tribromophenoxypropyl methacrylate, 2-hydroxy-3-trichlorophenoxypropyl methacrylate, 2-hydroxy-3-trichlorophenoxypropyl acrylate, 3-hydroxy-2-tribromophenoxypropyl methacrylate, 3-hydroxy-2-trichlorophenoxypropyl methacrylate, 3-hydroxy-2-trichlorophenoxypropyl acrylate, 2-trichlorophenoxyethyl acrylate, 2-trichlorophenoxyethyl methacrylate, 2-tribromophenoxyethyl acrylate, 2-tribromophenoxyethyl methacrylate, 2-pentachlorophenoxyethyl acrylate, 2-pentachlorophenoxyethyl methacrylate, 2-pentachlorophenoxy-2-methylethyl acrylate, 2-pentabromophenoxy-2-methylethyl acrylate, 2-pentachlorophenoxy-2-butyl acrylate, 2-pentabromophenoxy-2-butyl methacrylate, 4-tribromophenoxybutyl acrylate, 4-tribromophenoxybutyl methacrylate, 4-pentachlorophenoxybutyl acrylate, 4-pentachlorophenoxybutyl methacrylate and 4-pentabromophenoxybutyl methacrylate.

4. A flame-retardant polymer composition set forth in claim 1 wherein the amount used of the monomer represented by the general formula (A) is 50 to 100 percent by weight.

5. A flame-retardant polymer composition set forth in claim 1 wherein the flame-retardant polymer consisting of singly the monomer represented by the general formula (A).

6. A flame-retardant polymer composition set forth in claim 1 wherein the amount of the flame-retardant polymer incorporated into the different polymer is 5 to 35 percent by weight based on the different polymer.

7. The flame-retardant polymer composition set forth in claim 1, wherein the unsaturated compounds copolymerizable with the flame-retarding monomer represented by the general formula (A) is at least one member selected from the group consisting of vinyl chloride, vinylidene chloride, vinyl bromide, chlorostyrene, chloroprene, 1,4,5,6,7,7-hexachlorobicyclo-[2,2,1]-5-heptene-2-carboxylic acid vinyl ester, 1,4,5,6,7,7-hexabromobicyclo-[2,2,1]-5-heptene-2-carboxylic acid vinyl ester, triallyl cyanurate, and phosphorus-containing unsaturated compounds represented by the following general formula:

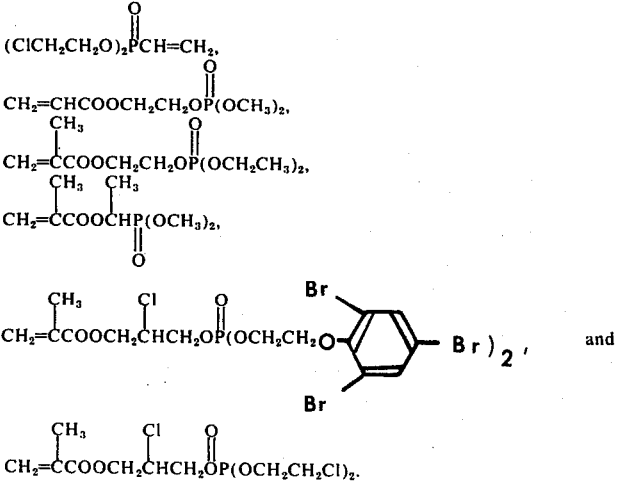

* * * * *